(12) United States Patent
Mizutani et al.

(10) Patent No.: US 9,873,804 B2
(45) Date of Patent: Jan. 23, 2018

(54) ACTIVE-ENERGY-RAY-CURABLE COMPOSITION, ACTIVE-ENERGY-RAY-CURABLE INK, COMPOSITION STORED CONTAINER, IMAGE FORMING METHOD, IMAGE FORMING APPARATUS, CURED MATERIAL, AND IMAGE FORMED MATTER

(71) Applicants: Yuuki Mizutani, Kanagawa (JP); Mihoko Matsumoto, Shizuoka (JP); Masayuki Koyano, Kanagawa (JP); Azumi Miyaake, Kanagawa (JP); Shun Saito, Kanagawa (JP); Mio Kumai, Tokyo (JP)

(72) Inventors: Yuuki Mizutani, Kanagawa (JP); Mihoko Matsumoto, Shizuoka (JP); Masayuki Koyano, Kanagawa (JP); Azumi Miyaake, Kanagawa (JP); Shun Saito, Kanagawa (JP); Mio Kumai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/299,739

(22) Filed: Oct. 21, 2016

(65) Prior Publication Data

US 2017/0137640 A1    May 18, 2017

(30) Foreign Application Priority Data

Nov. 17, 2015    (JP) .................................. 2015-224901

(51) Int. Cl.
*C09D 11/101*    (2014.01)
*B41J 2/01*    (2006.01)
(Continued)

(52) U.S. Cl.
CPC ............... *C09D 11/101* (2013.01); *B41J 2/01* (2013.01); *C08F 2/50* (2013.01); *C08J 7/047* (2013.01);
(Continued)

(58) Field of Classification Search
CPC ..... C09D 11/101; C09D 11/38; C09D 11/324; C08J 7/047; C08J 7/18; C08J 2433/10;
(Continued)

(56) References Cited

U.S. PATENT DOCUMENTS 8,632,174 B2    1/2014    Noguchi et al.
8,727,522 B2    5/2014    Maekawa et al.
(Continued)

FOREIGN PATENT DOCUMENTS

JP    4214141    11/2008
JP    4310355    5/2009
(Continued)

*Primary Examiner* — Alessandro Amari
*Assistant Examiner* — Roger W Pisha, II
(74) *Attorney, Agent, or Firm* — Oblon, McClelland, Maier & Neustadt, L.L.P.

(57) ABSTRACT

Active-energy-ray-curable composition including: monofunctional monomers; and polymerization initiator, cured material of the composition satisfying 0.30≤D≤0.85, where D is difference between peak-area-ratios A and B in infrared-ATR and obtained by: the composition is coated on polycarbonate substrate to form coated film having average thickness of 10 μm; the film is irradiated with active energy rays having light quantity of 500 mJ/cm² at UV intensity of 1.0 W/cm² for curing; the A is obtained from Formula (1) by infrared-ATR at one portion present from the cured material surface through 1 μm away therefrom toward the substrate, the B is obtained from Formula (1) by infrared-ATR at one portion present from the substrate-cured material interface through 1 μm away therefrom toward the cured material surface, (Continued)

Peak-area (from 1,679 m$^{-1}$ through 1,751 m$^{-1}$/peak-area (from 1,096 m$^{-1}$ through 1,130 m$^{-1}$)  Formula (1), and the A and B obtained are used to obtain D from Formula (2):

$$D = \text{peak-area-ratio } A - \text{peak-area-ratio } B \quad \text{Formula (2).}$$

11 Claims, 2 Drawing Sheets

(51) Int. Cl.
    *C08F 2/50*     (2006.01)
    *C08J 7/18*     (2006.01)
    *C09D 11/324*     (2014.01)
    *C09D 11/38*     (2014.01)
    *C08J 7/04*     (2006.01)
(52) U.S. Cl.
    CPC ............... *C08J 7/18* (2013.01); *C09D 11/324* (2013.01); *C09D 11/38* (2013.01); *C08J 2369/00* (2013.01); *C08J 2433/08* (2013.01); *C08J 2433/10* (2013.01)
(58) Field of Classification Search
    CPC ...... C08J 2433/08; C08J 2369/00; B41J 2/01; C08F 2/50
    See application file for complete search history.

(56) References Cited

U.S. PATENT DOCUMENTS

| | | |
|---|---|---|
| 8,926,082 B2 | 1/2015 | Hiraoka |
| 8,926,083 B2 | 1/2015 | Hiraoka |
| 8,926,084 B2 | 1/2015 | Hiraoka |
| 9,068,094 B2 | 6/2015 | Hiraoka |
| 9,120,946 B2 | 9/2015 | Seno et al. |
| 9,428,665 B2 | 8/2016 | Hiraoka |
| 2011/0118405 A1* | 5/2011 | Suzuki ................ C08F 299/065 524/533 |
| 2012/0147103 A1 | 6/2012 | Hasegawa et al. |
| 2012/0200648 A1 | 8/2012 | Hiraoka et al. |
| 2012/0242768 A1 | 9/2012 | Seno et al. |
| 2013/0321539 A1 | 12/2013 | Hiraoka |
| 2014/0240414 A1 | 8/2014 | Hiraoka |
| 2014/0336298 A1 | 11/2014 | Hiraoka |
| 2014/0338562 A1 | 11/2014 | Hiraoka |
| 2015/0009265 A1 | 1/2015 | Kohzuki et al. |
| 2015/0042731 A1 | 2/2015 | Hiraoka |
| 2015/0077481 A1 | 3/2015 | Yoshino et al. |
| 2015/0099819 A1 | 4/2015 | Hiraoka |
| 2015/0126636 A1 | 5/2015 | Hiraoka |
| 2015/0130878 A1 | 5/2015 | Kohzuki et al. |
| 2015/0232675 A1 | 8/2015 | Yoshino et al. |
| 2015/0232676 A1 | 8/2015 | Hiraoka |
| 2015/0232677 A1 | 8/2015 | Hiraoka |
| 2015/0329729 A1 | 11/2015 | Hiraoka |
| 2016/0009931 A1 | 1/2016 | Kohzuki et al. |
| 2016/0075895 A1 | 3/2016 | Kohzuki et al. |
| 2016/0102216 A1 | 4/2016 | Hirade et al. |
| 2016/0257818 A1 | 9/2016 | Mezaki et al. |
| 2016/0257831 A1 | 9/2016 | Hirade et al. |
| 2017/0107385 A1* | 4/2017 | Kumai ................ C09D 11/101 |

FOREIGN PATENT DOCUMENTS

| | | |
|---|---|---|
| JP | 2010-222385 | 10/2010 |
| JP | 4865483 | 11/2011 |
| JP | 4899430 | 1/2012 |
| JP | 2015-083656 | 4/2015 |

* cited by examiner

ACTIVE-ENERGY-RAY-CURABLE COMPOSITION, ACTIVE-ENERGY-RAY-CURABLE INK, COMPOSITION STORED CONTAINER, IMAGE FORMING METHOD, IMAGE FORMING APPARATUS, CURED MATERIAL, AND IMAGE FORMED MATTER

CROSS-REFERENCE TO RELATED APPLICATIONS

The present application claims priority under 35 U.S.C. § 119 to Japanese Patent Application No. 2015-224901, filed Nov. 17, 2015. The contents of which are incorporated herein by reference in their entirety.

BACKGROUND OF THE INVENTION

Field of the Invention

The present disclosure relates to an active-energy-ray-curable composition, an active-energy-ray-curable ink, a composition stored container, an image forming method, an image forming apparatus, a cured material, and an image formed matter.

Description of the Related Art

Hitherto, active-energy-ray-curable inks have been supplied and used for offset printing, screen printing, and top coating agents. In recent years, an amount of the active-energy-ray-curable inks used has increased because there are advantages that a process of drying the ink can be simplified to result in cost saving and an amount of solvent volatilized can be reduced to attain environmental friendliness.

In recent years, there has increasingly been a demand that active-energy-ray-curable inks are recorded even on substrates to be processed for industrial applications. Therefore, images (cured materials) obtained by the active-energy-ray-curable inks have been required to have hardness, processability (e.g., drawability and punching processability), and scratch resistance, in addition to close adhesiveness of the images (cured materials) to substrates.

However, cured films of existing active-energy-ray-curable inks may often exhibit rigid but fragile film property. Therefore, Japanese Unexamined Patent Application Publication No. 2010-222385 has proposed an ink composition being excellent in curing ability, where an image obtained from the ink composition is excellent in blocking resistance and extensibility.

Japanese Patent No. 4214141 has proposed an energy-ray-curable ink composition having the following properties: low viscosity even without use of a dilution solvent; favorable printing quality even on non-absorbable recording media; and particularly excellent close adhesiveness to recording media.

Japanese Patent No. 4865483 has proposed a method for producing a recorded matter including an ink composition for molding process. A cured material of the ink composition has high flexibility and has enough intensity to endure molding process.

Japanese Patent No. 4310355 has proposed an ink including two monofunctional, radically polymerizable monomers and cyclodextrin or a derivative thereof, in order to achieve adhesive property, tackiness, and molding property.

In addition, Japanese Patent No. 4899430 has proposed an active-energy-ray-curable ink for inkjet, the active-energy-ray-curable ink having flexibility and being excellent in curing ability and close adhesiveness.

Moreover, Japanese Unexamined Patent Application Publication No. 2015-083656 has proposed an active-energy-ray-curable ink having the following properties: drawability of 2 or more determined before and after a tension test; and close adhesiveness of 70 or more to polycarbonate substrates, which is determined by a cross-cut adhesion test.

SUMMARY OF THE INVENTION

According to one aspect of the present disclosure, an active-energy-ray-curable composition includes two or more monofunctional monomers and a polymerization initiator. A cured material of the active-energy-ray-curable composition satisfies $0.30 \leq D \leq 0.85$, where D is a difference between a peak area ratio A and a peak area ratio B in an infrared ATR method of the cured material and being obtained by a method described below.

(Method for Determining Difference D between Peak Area Ratios in Infrared ATR Method)

(i) The active-energy-ray-curable composition is coated on a polycarbonate substrate to form a coated film having an average thickness of 10 μm.

(ii) The coated film is irradiated with active energy rays having a light quantity of 500 mJ/cm$^2$ at a UV intensity of 1.0 W/cm$^2$ to cure the coated film to form a cured material.

(iii) The peak area ratio A is obtained from Formula (1) below by the infrared ATR method at one portion of the cured material, the one portion being within a region ranging from a surface of the cured material through 1 μm away from the surface of the cured material toward the substrate. The peak area ratio B is obtained from the Formula (1) below by the infrared ATR method at one portion of the cured material, the one portion being within a region ranging from an interface between the substrate and the cured material through 1 μm away from the interface toward the surface of the cured material.

$$\text{Peak area (from 1,679 m}^{-1}\text{ through 1,751 m}^{-1}\text{)/peak area (from 1,096 m}^{-1}\text{ through 1,130 m}^{-1}\text{)} \quad \text{Formula (1)}$$

(iv) The peak area ratio A and the peak area ratio B obtained in the (iii) are used to obtain the difference D between the peak area ratios from Formula (2) below:

$$D = \text{peak area ratio } A - \text{peak area ratio } B \quad \text{Formula (2).}$$

DESCRIPTION OF THE EMBODIMENTS (Active-Energy-Ray-Curable Composition)

Figure 1:
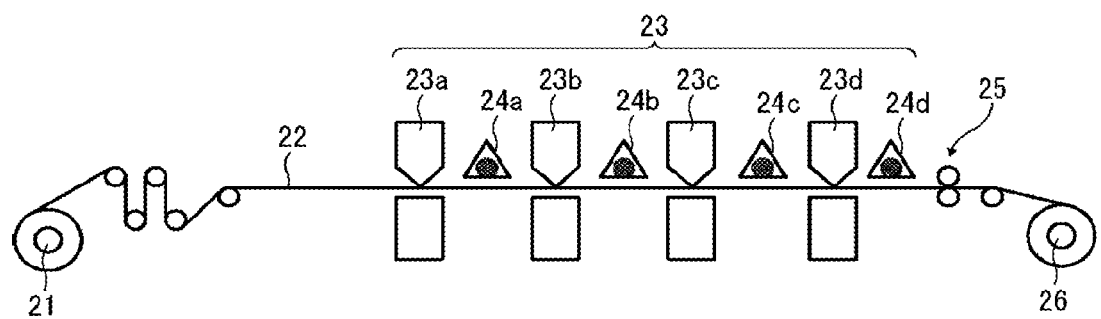
FIG. 1 is a schematic view of an example of an image forming apparatus of the present disclosure.

An active-energy-ray-curable composition of the present disclosure includes two or more monofunctional monomers and a polymerization initiator. The active-energy-ray-curable composition further includes a colorant, an organic solvent, and other components if necessary.

Existing active-energy-ray-curable compositions are basically designed on the premise of using relatively high active energy of 1,500 mJ/cm$^2$ or more for curing, having a problem with being unable to satisfactorily achieve both curing ability and close adhesiveness under irradiation of low active energy.

The present disclosure has been made under such circumstances and has an object to achieve the following.

That is, the present disclosure has an object to provide an active-energy-ray-curable composition, a cured material of the active-energy-ray-curable composition achieving sufficient hardness and close adhesiveness to a substrate even through irradiation of relatively low active energy rays.

According to the present disclosure, it is possible to provide an active-energy-ray-curable composition, a cured material of the active-energy-ray-curable composition having hardness and close adhesiveness to a substrate that are comparable to those of cured materials of existing active-energy-ray-curable compositions even through irradiation of active energy rays having low energy.

As a result of the studies diligently performed by the present inventors to solve the above existing technical problems, it has been found that the following active-energy-ray-curable composition can solve the above problems. Specifically, the active-energy-ray-curable composition includes two or more monofunctional monomers and a polymerization initiator, a cured material of the active-energy-ray-curable composition satisfying $0.30 \leq D \leq 0.85$, where D is a difference between peak area ratios in an infrared ATR method of the cured material.

(Method for Determining Difference D between Peak Area Ratios in Infrared ATR Method)
(i) The active-energy-ray-curable composition is coated on a polycarbonate substrate to form a coated film having an average thickness of 10 μm.
(ii) The coated film is irradiated with active energy rays having a light quantity of 500 mJ/cm$^2$ at a UV intensity of 1.0 W/cm$^2$ to cure the coated film to form a cured material.
(iii) The peak area ratio A is obtained from Formula (1) below by the infrared ATR method at one portion of the cured material, the one portion being within a region ranging from a surface of the cured material through 1 μm away from the surface of the cured material toward the substrate. The peak area ratio B is obtained from the Formula (1) below by the infrared ATR method at one portion of the cured material, the one portion being within a region ranging from an interface between the substrate and the cured material through 1 μm away from the interface toward the surface of the cured material.

Peak area (from 1,679 m$^{-1}$ through 1,751 m$^{-1}$)/peak area (from 1,096 m$^{-1}$ through 1,130 m$^{-1}$)  Formula (1)

(iv) The peak area ratio A and the peak area ratio B obtained in the (iii) are used to obtain the difference D between the peak area ratios from Formula (2) below:

D=peak area ratio A–peak area ratio B  Formula (2).

In the above Formula (1), the peak area (from 1,679 m$^{-1}$ through 1,751 m$^{-1}$) is attributed to a carbonyl group and the peak area (from 1,096 m$^{-1}$ through 1,130 m$^{-1}$) is attributed to an ether bond, the carbonyl group and the ether bond being incorporated into the monomers present in the active-energy-ray-curable composition.

Therefore, what is meant by the Formula (2) is that the improved effects result from the formulation where the carbonyl group is rich in the surface of the composition and the ether bond is rich near the substrate.

That is, control of distribution of the two or more monofunctional monomers incorporated into the active-energy-ray-curable ink makes it possible for each of the monofunctional monomers to sufficiently exhibit the properties. Therefore, even if the active-energy-ray-curable ink is irradiated with active energy rays having lower energy than active energy rays with which the existing active-energy-ray-curable inks are irradiated, it is possible to obtain the active-energy-ray-curable ink achieving both hardness easily affected by properties of the cured material near the surface and close adhesiveness easily affected by properties of the cured material near the interface.

In order to obtain these excellent properties, it is particularly important that the difference D between the peak area ratios be $0.30 \leq D \leq 0.85$. When this difference D between the peak area ratios is less than 0.30, the two or more monofunctional monomers are uniformly present, and a monomer more easily inhibited by oxygen hardly proceeds to polymerization reaction. As a result, hardness and close adhesiveness are adversely affected. When the difference D between the peak area ratios is more than 0.85, a film of the active-energy-ray-curable ink has considerably different formulations depending on regions of the film. As a result, the film is peeled during a close adhesiveness test, resulting in deterioration of close adhesiveness.

<Monofunctional Monomer>

Examples of the monofunctional monomer of the present disclosure include benzyl (meth) acrylate, hydroxyethyl (meth) acrylamide, isobornyl (meth)acrylate, adamantyl (meth)acrylate, 2-methyl-2-adamantyl (meth) acrylate, (meth)acryloyl morpholine, dimethylaminopropyl (meth) acrylamide, dicyclopentenyl (meth) acrylate, dicyclopentanyl (meth) acrylate, dicyclopentenyl oxyethyl (meth)acrylate, tetrahydrofurfuryl (meth)acrylate, cyclohexyl (meth) acrylate, (cyclohexanespiro-2-(1,3-dioxolan-4-yl)) methylacrylate (CHDOL-10 (available from Osaka Organic Chemical Industry Ltd.)), (2-methyl-2-ethyl-1,3-dioxolan-4-yl) methylacrylate (MEDOL-10 (available from Osaka Organic Chemical Industry Ltd.)), and 4-(meth)acryloyloxymethyl-2-cyclohexyl 1,3-dioxolane. A difference between solubility parameter of the monofunctional monomer and solubility parameter of the substrate is preferably smaller. Among the two or more monomers selected in the present disclosure, it is more preferable that polymerization speed of one monomer having solubility parameter closer to solubility parameter of the substrate be slower than polymerization speed of another monomer.

Among them, at least two selected from the group consisting of benzyl acrylate, cyclohexyl methacrylate, acryloyl morpholine, and dimethylaminopropylacryl amide are preferable.

An amount of the monofunctional monomer is preferably 95% by mass or more but 98% by mass or less relative to the total amount of the active-energy-ray-curable composition.

<Polymerization Initiator>

Any polymerization initiator may be used so long as the polymerization initiator can initiate polymerization of polymerizable compounds (monomers or oligomers) by producing active species (e.g., radicals or cations) upon application of energy such as active energy rays. Examples of the polymerization initiator include known radical polymerization initiators, cation polymerization initiators, and base producing agents. These may be used alone or in combination. Among them, radical polymerization initiators are preferably used. Moreover, an amount of the polymerization initiator is preferably from 1% by mass through 20% by mass relative to the total amount (100% by mass) of the active-energy-ray-curable composition.

Specific examples of the radical polymerization initiators include, but are not limited to, aromatic ketones, aromatic onium chlorides, organic peroxides, hexaaryl biimidazole compounds, ketoxime ester compounds, borate compounds, azinium compounds, metallocene compounds, active ester compounds, compounds having a carbon halogen bond(s), and alkyl amine compounds.

In addition, a polymerization accelerator (sensitizer) can be used with the polymerization initiator. Preferable examples of the polymerization accelerator include, but are not limited to, amine compounds such as trimethylamine, methyl dimethanol amine, triethanol amine, p-diethylamino acetophenone, p-dimethyl amino ethylbenzoate, p-dimethyl amino benzoate-2-ethylhexyl, N,N-dimthyl benzylamine, and 4,4'-bis(diethylamino)benzophenone. An amount of the polymerization accelerator may be appropriately adjusted depending on the kind and the amount of the polymerization initiator to be used.

Moreover, it is found that when the polymerization initiator incorporated into the active-energy-ray-curable ink includes a phosphorus element or a sulfur element, a cured material of the active-energy-ray-curable ink is considerably improved in hardness and close adhesiveness. The reason for this will be described below. When the polymerization initiator of the active-energy-ray-curable ink includes a polymerization initiator including the phosphorus element or the sulfur element, which leads to relatively low photo-polymerization speed, it is possible to obtain latitude in time until time at which the active-energy-ray-curable ink is cured. As a result, among the two or more monofunctional monomers, one monomer in the active-energy-ray-curable ink, which less undergoes polymerization inhibition due to oxygen, can be easily precipitated onto the surface of the cured material. The cured material has a large gradient in distribution of the monomers between at a side of the surface and at a side of the interface, resulting in considerably improved effect.

Examples of the initiators including phosphorus elements include acylphosphine oxide compounds (e.g., 2,4,6-trimethylbenzoyl diphenylphosphine oxide and 2,4,6-trimethylbenzoyl diphenylethoxyphosphine oxide), 2-dimethylamino-2-(4-methyl-benzyl)-1-(4-morpholin-4-yl-phenyl) butan-1-one, and bis(2,6-dimethoxybenzoyl)-2,4,4-trimethylpentyl phosphine oxide compound. These may be used alone or in combination.

Examples of the initiators including sulfur elements include thioxanthone compounds (e.g., isopropylthioxanthone, 2,4-diethylthioxanthone, and 2-chlorothioxanthone), and aromatic sulfonium salt compounds (e.g., hexafluoride phosphorus-based sulfonium salt). These may be used alone or in combination.

<Substrate>

The substrate that can be used in a method for forming an image or a cured material of the present disclosure is not particularly limited and may be appropriately selected depending on the intended purpose. Examples of the substrate include paper, plastics, metals, ceramics, glasses, and composite materials thereof.

Among them, because the active-energy-ray-curable ink of the present disclosure is immediately cured through irradiation of light, preferable are impermeable substrates, and more preferable are polyethylene, polypropylene, polyethylene terephthalate, polycarbonate, ABS resins, polyvinyl chloride, polystyrene, other polyesters, polyamide, vinyl materials, acryl resins, and plastic films and plastic molded matters, which are formed of materials obtained in combination with the above materials.

When polycarbonate or an ABS resin is used for the substrate, tetrahydrofurfuryl (meth)acrylate, cyclohexyl (meth) acrylate, benzyl (meth)acrylate, and (meth)acryloyl morpholine are preferable because of high solubility to the polycarbonate. When acryl is used for the substrate, dimethylaminopropylacryl amide is preferable because of high solubility to an acryl resin.

<Measurement of Infrared Absorption Spectrum>

(Preparation of Sample)

One exemplary method for exposing the surface of the cured material of the active-energy-ray-curable composition includes a method called SAICAS. Specifically, SAICAS NN04 (available from DAIPLA WINTES) is used as a device to slantingly cut the surface of the cured material to expose the cross section of the cured material. When the surface of the cured material is slantingly cut, it is possible to secure a cross section having a larger area, which makes it easy to evaluate formulation of the cross section.

(Measurement Method and Measurement Device)

An amount of the functional group of the active-energy-ray-curable composition was evaluated by an infrared ATR method (total reflection method). The infrared ATR method is performed in the following manner: a sample is closely attached to a medium having a high refractive index (prism); and total reflection of infrared rays generated at an interface between the prism and the sample is used for measurement. This method is a method for measuring evanescent waves caused by penetration of the infrared rays into a side of the sample when the infrared rays are totally reflected, and this method is used for analyzing a structure of the surface of the sample. More specifically, SPOTLIGHT 400 (available from PerkinElmer Japan Co., Ltd.) was used as the device, and a germanium crystal having a hemisphere shape was used as the prism. In the present evaluation, the cross section of the active-energy-ray-curable composition that had been exposed by the above method was determined for infrared absorption spectrum at a position of any depth by the infrared ATR method.

(Method for Calculating Difference D between Peak Area Ratios)

A cured material of the active-energy-ray-curable composition was measured for infrared absorption spectrum using FT-IR AVATER 330 (available from Nicolet) by an infrared ATR method under the following conditions: a range of wave number: from 4,000 $cm^{-1}$ through 700 $cm^{-1}$, resolution: 4 $cm^{-1}$, cumulative number: 64. The sample used was left to stand for one day or longer in a room being adjusted to a temperature of 23° C. and a relative humidity of 50%.

The obtained infrared absorption spectrum was measured for two peak area ratios using a peak area tool of OMNIC E.S.P. software package to calculate a peak area ratio at each depth. Here, one peak area is a peak area attributed to a carbonyl group and has a maximum absorption in a region of from 1,679 $cm^{-1}$ through 1,751 $cm^{-1}$, and the other peak area is a peak area attributed to an ether bond and has a maximum absorption in a region of from 1,096 $cm^{-1}$ through 1,130 $cm^{-1}$. A base line is defined as a line connecting both ends of an absorption curve including some peaks or a line connecting one end of an absorption curve and one end of another absorption peak.

The calculated peak area ratio of the infrared spectrum was calculated in a region 0.5 μm away toward the substrate from the surface of the cured material of the same sample and in a region 0.5 μm away from an interface between the substrate and the cured material toward the surface of the cured material to obtain a peak area ratio A and a peak area ratio B. Next, a difference D between the peak area ratios, which was obtained from the following Formula (2). Here, the difference D was an average value determined by using differences D at any 6 portions on the same sample.

$$D = \text{peak area ratio } A - \text{peak area ratio } B \qquad \text{Formula (2).}$$

<Active Energy Rays>

Active energy rays used for curing an active-energy-ray-curable composition of the present disclosure are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Colorant>

The composition of the present disclosure may contain a colorant. As the colorant, various pigments and dyes may be used that impart black, white, magenta, cyan, yellow, green, orange, and gloss colors such as gold and silver, depending on the intended purpose of the composition and requisite properties thereof. A content of the colorant in the composition is not particularly limited, and may be appropriately determined considering, for example, a desired color density and dispersibility of the colorant in the composition. However, it is preferably from 0.1% by mass to 20% by mass relative to the total mass (100% by mass) of the composition. Incidentally, the active-energy-ray-curable composition of the present disclosure does not necessarily contain a colorant but can be clear and colorless. In such a case, for example, such a clear and colorless composition is good for an overcoating layer to protect an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, polymer dispersants conventionally used to prepare pigment dispersion (material).

The dyes include, for example, acidic dyes, direct dyes, reactive dyes, basic dyes, and combinations thereof.

<Organic Solvent>

The active-energy-ray-curable composition of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

The active-energy-ray-curable composition of the present disclosure optionally contains other known components. The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<Preparation of Active-energy-ray-curable Composition>

The active-energy-ray-curable composition of the present disclosure can be prepared by using the components described above. The preparation devices and conditions are not particularly limited. For example, the curable-composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, and a surfactant.

<Viscosity>

The viscosity of the active-energy-ray-curable composition of the present disclosure has no particular limit because it can be adjusted depending on the purpose and application devices. For example, if an ejecting device that ejects the composition from nozzles is employed, the viscosity thereof is preferably in the range of 3 mPa·s to 40 mPa·s, more preferably 5 mPa·s to 15 mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO., LTD.) using a cone rotor (1°34'× R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<Application Field>

The application field of the active-energy-ray-curable composition of the present disclosure is not particularly limited. It can be applied to any field where active-energyray-curable compositions are used. For example, the curable composition is selected to a particular application and used for a resin for processing, a paint, an adhesive, an insulant, a releasing agent, a coating material, a sealing material, various resists, and various optical materials.

Figure 2:
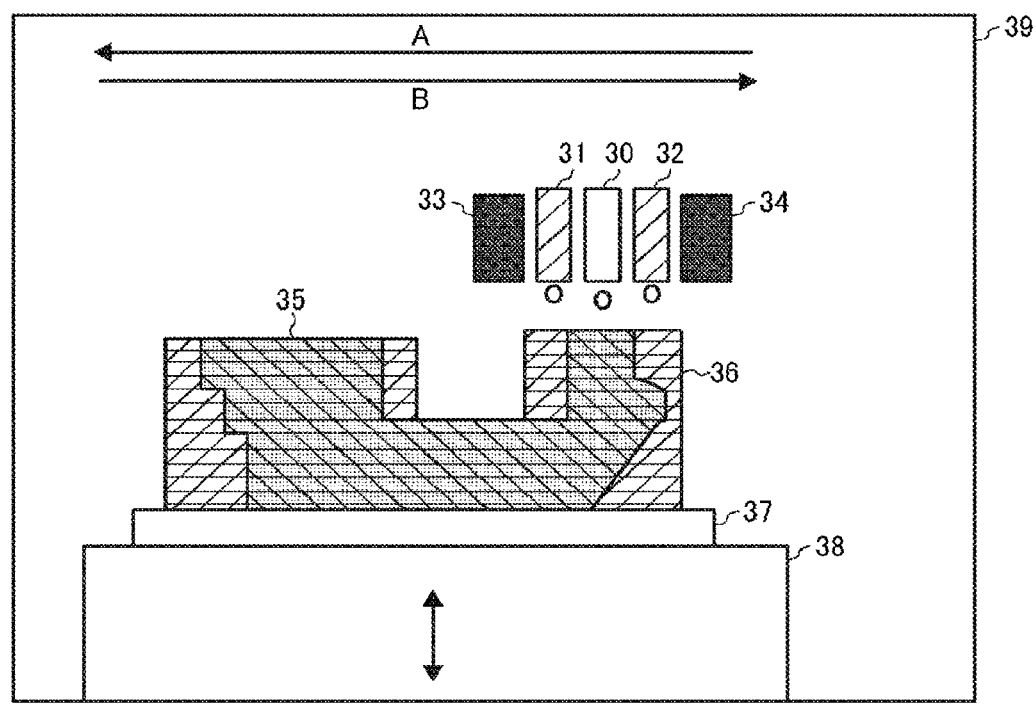
FIG. 2 is a schematic view of an example of another image forming apparatus of the present disclosure.
Figure 3A:
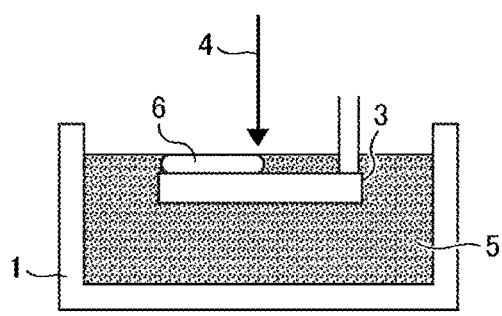
FIG. 3A is a schematic view of an example of still another image forming apparatus of the present disclosure.
Figure 3B:
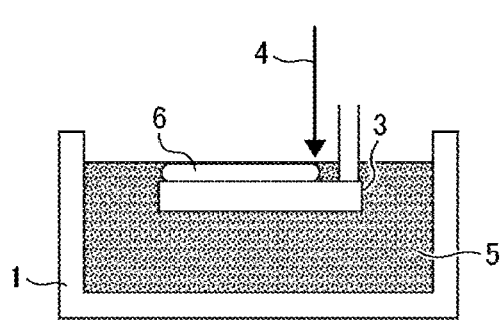
FIG. 3B is a schematic view of an example of still another image forming apparatus of the present disclosure.
Figure 3C:
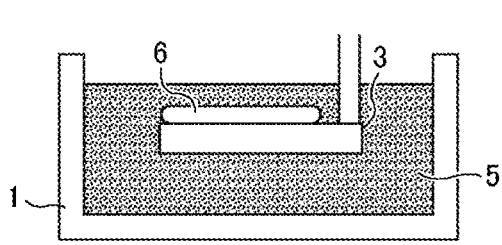
FIG. 3C is a schematic view of an example of still another image forming apparatus of the present disclosure.
Figure 3D:
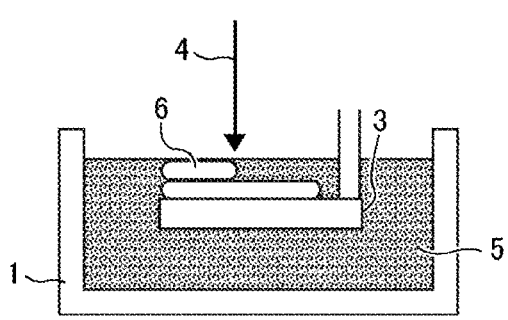
FIG. 3D is a schematic view of an example of still another image forming apparatus of the present disclosure.

Furthermore, the active-energy-ray-curable composition of the present disclosure can be used as an ink to form two-dimensional texts, images, and designed coating film on various substrates and in addition as a solid object forming material to form a three-dimensional object. This three dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2, FIG. 3A, FIG. 3B, FIG. 3C, and FIG. 3D. FIG. 2 is a diagram illustrating a method of additive manufacturing to sequentially form layers of the active-energy-ray-curable composition of the present disclosure one on top of the other by repeating discharging the curable composition to particular areas followed by curing upon irradiation of an active energy ray (details will be described below). FIGS. 3A to 3D are each a diagram illustrating a method of additive manufacturing to sequentially form cured layers 6 having respective predetermined forms one on top of the other on a movable stage 3 by irradiating a storing pool (storing part) 1 of the active energy ray curable composition 5 of the present disclosure with the active energy ray 4.

An apparatus for fabricating a three-dimensional object by the active-energy-ray-curable composition of the present disclosure is not particularly limited and can be a known apparatus. For example, the apparatus includes a containing device, a supplying device, and a discharging device of the curable composition, and an active energy ray irradiator.

In addition, the present disclosure includes cured materials obtained by curing the active-energy-ray-curable composition and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

<Composition Stored Container>

The composition stored container of the present disclosure contains the active-energy-ray-curable composition and is suitable for the applications as described above. For example, if the active-energy-ray-curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

<Image Forming Method and Image Forming Apparatus>

The image forming method of the present disclosure includes at least an irradiating step of irradiating the curable composition of the present disclosure with an active energy ray to cure the curable composition. The image forming apparatus of the present disclosure includes at least an irradiator to irradiate the curable composition of the present disclosure with an active energy ray and a storing part containing the active-energy-ray-curable composition of the present disclosure. The storing part may include the container mentioned above. Furthermore, the method and the apparatus may respectively include a discharging step and a discharging device to discharge the active energy ray curable composition. The method of discharging the curable composition is not particularly limited, and examples thereof include a continuous jetting method and an on-demand method. The on-demand method includes a piezo method, a thermal method, an electrostatic method, etc.

FIG. 1 is a diagram illustrating a two-dimensional image forming apparatus equipped with an inkjet discharging device. Printing units 23a, 23b, 23c, and 23d respectively having ink cartridges and discharging heads for yellow, magenta, cyan, and black active-energy-ray-curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a 3D object) of the present disclosure. An image forming apparatus 39 illustrated in FIG. 2 sequentially forms thin layers one on top of the other using a head unit having inkjet heads arranged movable in the directions indicated by the arrows A and B. In the image forming apparatus 39, an ejection head unit 30 for additive manufacturing ejects a first active-energy-ray-curable composition, and ejection head units 31 and 32 for support and curing these compositions ejects a second active-energy-ray-curable composition having a different composition from the first active-energy-ray-curable composition, while ultraviolet irradiators 33 and 34 adjacent to the ejection head units 31 and 32 cure the compositions. To be more specific, for example, after the ejection head units 31 and 32 for support eject the second active-energy-ray-curable composition onto a substrate 37 for additive manufacturing and the second active-energy-ray-curable composition is solidified by irradiation of an active energy ray to form a first substrate layer having a space for composition, the ejection head unit 30 for additive manufacturing ejects the first active-energy-ray-curable composition onto the pool followed by irradiation of an active energy ray for solidification, thereby forming a first additive manufacturing layer. This step is repeated multiple times lowering the stage 38 movable in the vertical direction to laminate the supporting layer (or support layer) and the additive manufacturing layer to fabricate a solid object 35. Thereafter, an additive manufacturing support 36 is removed, if desired. Although only a single ejection head unit 30 for additive manufacturing is provided to the image forming apparatus illustrated 39 in FIG. 2, it can have two or more units 30.

(Image Formed Matter)

A two-dimensional or three-dimensional image formed matter of the present disclosure is obtained by applying, to a substrate, the active-energy-ray-curable composition of the present disclosure or the active-energy-ray-curable ink of the present disclosure, and curing the active-energy-ray-curable composition or the active-energy-ray-curable ink.

Examples of the two-dimensional or three-dimensional image formed matter recorded by the active-energy-ray-curable ink of the present disclosure include a two-dimensional or three-dimensional image formed matter recorded on a smooth surface of plain paper or a resin film, a two-dimensional or three-dimensional image formed matter recorded on a concave-convex recording surface, and a two-dimensional or three-dimensional image formed matter recorded on a surface of the recording media formed of various materials such as metals and ceramics.

Examples of the two-dimensional image formed matter include characters, symbols, figures, combinations thereof, and solid images.

Examples of the three-dimensional image formed matter include three-dimensional objects.

An average thickness of the three-dimensional object is not particularly limited and may be appropriately selected depending on the intended purpose, but it is preferably 10 µm or more.

EXAMPLES

Active-energy-ray-curable compositions of the present disclosure will be described in more detail by ways of the following Examples and Comparative Examples. However, the present disclosure should not be construed as being limited to these Examples.

Unless otherwise specified, "part(s)" means "part(s) by mass" and "%" means "% by mass".

Example 1

| | |
|---|---|
| Benzyl acrylate | 25 parts |
| Acryloyl morpholine | 70 parts |
| Carbon black #10 (available from Mitsubishi Chemical Corporation) | 3 parts |

The above materials were charged into a ball-mill disperser and were dispersed to prepare a pigment dispersion liquid. A polymerization initiator, 2-dimethylamino-2-(4-methylbenzyl)-1-(4-morpholin-4-yl-phenyl)-butan-1-one, a polymerization inhibitor (p-benzoquinone, available from Tokyo Chemical Industry Co., Ltd.) (0.1 parts), and a surfactant (SURFYNOL 465, available from Nissin Chemical Industry Co., Ltd.) (0.9 parts) were added to the pigment dispersion liquid. The resultant mixture was further mixed to obtain an active-energy-ray-curable ink.

The active-energy-ray-curable ink was coated on a polycarbonate film substrate (IUPILONE 100FE2000 masking, thickness 100 µm, available from Mitsubishi Engineering-Plastics Corporation) using a wire bar (winding No. #6, available from Kobayashi Engineering Works, Ltd.) to prepare a solid coated film having a thickness of about 10 µm.

Using a UV irradiator LH6 (available from Fusion Systems Japan), the obtained coated film was irradiated with active energy rays (cumulative light: 500 mJ/cm$^2$) at a UV intensity of 1.0 W/cm$^2$ by using a wavelength region corresponding to a UV-A region (wavelength of 350 nm or more but 400 nm or less) and the coated film was cured to obtain [cured material 1].

Example 2

[Cured material 2] was obtained in the same manner as in Example 1 except that the formulation of the pigment dispersion liquid of Example 1 was changed to the following formulation.

| | |
|---|---|
| Benzyl acrylate | 55 parts |
| Acryloyl morpholine | 40 parts |
| Carbon black #10 | 3 parts |

Example 3

[Cured material 3] was obtained in the same manner as in Example 1 except that the formulation of the pigment dispersion liquid of Example 1 was changed to the following formulation.

| | |
|---|---|
| Benzyl acrylate | 70 parts |
| Acryloyl morpholine | 25 parts |
| Carbon black #10 | 3 parts |

Example 4

[Cured material 4] was obtained in the same manner as in Example 2 except that the kind of the polymerization initiator of Example 2 was changed to 2,4,6-trimethylbenzoyl diphenylphosphine oxide.

Example 5

[Cured material 5] was obtained in the same manner as in Example 2 except that the kind of the polymerization initiator of Example 2 was changed to 2,4,6-trimethylbenzoyl diphenylethoxyphosphine oxide.

Example 6

[Cured material 6] was obtained in the same manner as in Example 2 except that the kind of the polymerization initiator of Example 2 was changed to isopropylthioxanthone.

Example 7

[Cured material 7] was obtained in the same manner as in Example 2 except that the kind of the polymerization initiator of Example 2 was changed to 2,4-diethylthioxanthone.

Example 8

[Cured material 8] was obtained in the same manner as in Example 2 except that the formulation of the pigment dispersion liquid of Example 2 was changed to the following formulation.

| | |
|---|---|
| Benzyl acrylate | 55 parts |
| Dimethylaminopropylacryl amide | 40 parts |
| Carbon black #10 | 3 parts |

Example 9

[Cured material 9] was obtained in the same manner as in Example 2 except that the formulation of the pigment dispersion liquid of Example 2 was changed to the following formulation.

| | |
|---|---|
| Cyclohexyl methacrylate | 55 parts |
| Acryloyl morpholine | 40 parts |
| Carbon black #10 | 3 parts |

Example 10

[Cured material 10] was obtained in the same manner as in Example 2 except that the formulation of the pigment dispersion liquid of Example 2 was changed to the following formulation.

| | |
|---|---|
| Cyclohexyl methacrylate | 55 parts |
| Dimethylaminopropylacryl amide | 40 parts |
| Carbon black #10 | 3 parts |

Comparative Example 1

[Cured material 11] was obtained in the same manner as in Example 1 except that the formulation of the pigment dispersion liquid of Example 1 was changed to the following formulation.

| | |
|---|---|
| Benzyl acrylate | 90 parts |
| Acryloyl morpholine | 5 parts |
| Carbon black #10 | 3 parts |

Comparative Example 2

[Cured material 12] was obtained in the same manner as in Example 1 except that the formulation of the pigment dispersion liquid of Example 1 was changed to the following formulation.

| | |
|---|---|
| Benzyl acrylate | 5 parts |
| Acryloyl morpholine | 90 parts |
| Carbon black #10 | 3 parts |

Comparative Example 3

[Cured material 13] was obtained in the same manner as in Example 2 except that the kind of the polymerization initiator of Example 2 was changed to 1-hydroxycyclohexyl phenyl ketone.

Comparative Example 4

[Cured material 14] was obtained in the same manner as in Example 5 except that the irradiation of the active energy rays was changed to cumulative light of 1,500 mJ/cm$^2$.

Next, each of the obtained cured materials was measured for close adhesiveness to the substrate and pencil hardness in the following manners. The cured material where both close adhesiveness to the substrate and pencil hardness were ranked as B or more was defined as "Good". Results are presented in Tables 1-1, 1-2, and 1-3.

<Close Adhesiveness to Substrate>

Each of the prepared cured materials 1 to 14 was evaluated for close adhesiveness according to the cross-cut adhesion test of JIS K5400 (old standard).

Here, the close adhesiveness being 100 means that none of the cross-cut portions obtained by cutting the cured material into 100 pieces is not peeled. The close adhesiveness being 70 means that the total area of the non-peeled portions is 70% relative to the entire area.

[Evaluation Criteria]

A: Close adhesiveness was 95 or more but 100 or less

B: Close adhesiveness was 70 or more but 94 or less.

C: Close adhesiveness was less than 70

<Pencil Hardness>

Each of the prepared cured materials 1 to 14 was measured for pencil hardness according to scratch hardness (pencil method) of JIS K5600-5-4.

[Evaluation Criteria]

A: HB or harder

B: B

C: 2B or softer

TABLE 1-1

| | | Examples | | | | |
|---|---|---|---|---|---|---|
| | | 1 Cured material 1 | 2 Cured material 2 | 3 Cured material 3 | 4 Cured material 4 | 5 Cured material 5 |
| Monomers | Benzyl acrylate (parts) | 25 | 55 | 70 | 55 | 55 |
| | Cyclohexyl methacrylate (parts) | | | | | |
| | Acryloyl morpholine (parts) | 70 | 40 | 25 | 40 | 40 |
| | Dimethylaminopropylacryl amide (parts) | | | | | |
| Pigment | Carbon black (parts) | 3 | 3 | 3 | 3 | 3 |
| Polymerization initiators | 2-Dimethylamino-2-(4-methylbenzyl)-1-(4-morpholin-4-yl-phenyl)butan-1-one | Added | Added | Added | | |
| | 2,4,6-Trimethylbenzoyl diphenylphosphine oxide | | | | Added | |
| | 2,4,6-Trimethylbenzoyl diphenylethoxyphosphine oxide | | | | | Added |
| | Isopropylthioxanthone | | | | | |
| | 2,4-Diethylthioxanthone | | | | | |
| | 1-Hydroxycyclohexyl phenyl ketone | | | | | |
| | Cumulative light (mJ/cm$^2$) | 500 | 500 | 500 | 500 | 500 |
| | Difference between peak area ratios (D) | 0.32 | 0.61 | 0.45 | 0.76 | 0.84 |
| Evaluations | Close adhesiveness/number — 90 or more but 100 or less: A; 70 or more but 94 or less: B; Less than 70: C | B | B | A | A | A |
| | Pencil hardness — HB or harder: A; B: B; 2B or softer: C | A | B | B | A | A |

TABLE 1-2

| | | Examples | | | | |
|---|---|---|---|---|---|---|
| | | 6 Cured material 6 | 7 Cured material 7 | 8 Cured material 8 | 9 Cured material 9 | 10 Cured material 10 |
| Monomers | Benzyl acrylate (parts) | 55 | 55 | 55 | | |
| | Cyclohexyl methacrylate (parts) | | | | 55 | 55 |
| | Acryloyl morpholine (parts) | 40 | 40 | | 40 | |
| | Dimethylaminopropylacryl amide (parts) | | | 40 | | 40 |
| Pigment | Carbon black (parts) | 3 | 3 | 3 | 3 | 3 |
| Polymerization initiators | 2-Dimethylamino-2-(4-methylbenzyl)-1-(4-morpholin-4-yl-phenyl)butan-1-one | | | Added | Added | Added |
| | 2,4,6-Trimethylbenzoyl diphenylphosphine oxide | | | | | |
| | 2,4,6-Trimethylbenzoyl diphenylethoxyphosphine oxide | | | | | |
| | Isopropylthioxanthone | Added | | | | |
| | 2,4-Diethylthioxanthone | | Added | | | |
| | 1-Hydroxycyclohexyl phenyl ketone | | | | | |
| | Cumulative light (mJ/cm$^2$) | 500 | 500 | 500 | 500 | 500 |
| | Difference between peak area ratios (D) | 0.81 | 0.80 | 0.30 | 0.34 | 0.32 |
| Evaluations | Close adhesiveness/number — 90 or more but 100 or less: A; 70 or more but 94 or less: B; Less than 70: C | A | A | B | A | B |
| | Pencil hardness — HB or harder: A; B: B; 2B or softer: C | A | A | A | B | B |

TABLE 1-3

|  |  | Comparative Examples | | | |
|---|---|---|---|---|---|
|  |  | 1<br>Cured<br>material 11 | 2<br>Cured<br>material 12 | 3<br>Cured<br>material 13 | 4<br>Cured<br>material 14 |
| Monomers | Benzyl acrylate (parts) | 90 | 5 | 55 | 55 |
|  | Cyclohexyl methacrylate (parts) |  |  |  |  |
|  | Acryloyl morpholine (parts) | 5 | 90 | 40 | 40 |
|  | Dimethylaminopropylacryl amide (parts) |  |  |  |  |
| Pigment | Carbon black (parts) | 3 | 3 | 3 | 3 |
| Polymerization initiators | 2-Dimethylamino-2-(4-methylbenzyl)-1-<br>(4-morpholin-4-yl-phenyl)butan-1-one | Added | Added |  |  |
|  | 2,4,6-Trimethylbenzoyl<br>diphenylphosphine oxide |  |  |  |  |
|  | 2,4,6-Trimethylbenzoyl<br>diphenylethoxyphosphine oxide |  |  |  | Added |
|  | Isopropylthioxanthone |  |  |  |  |
|  | 2,4-Diethylthioxanthone |  |  |  |  |
|  | 1-Hydroxycyclohexyl phenyl ketone |  |  | Added |  |
|  | Cumulative light (mJ/cm$^2$) | 500 | 500 | 500 | 1,500 |
|  | Difference between peak area ratios (D) | 0.21 | 0.18 | 0.28 | 0.86 |
| Evaluations | Close adhesiveness/ number | 90 or more but 100 or less: A<br>70 or more but 94 or less: B<br>Less than 70: C | C | A | C | C |
|  | Pencil hardness | HB or harder: A<br>B: B<br>2B or softer: C | A | C | C | A |

What is claimed is:

1. An active-energy-ray-curable composition comprising:
two or more monofunctional monomers; and
a polymerization initiator,
wherein a cured material of the active-energy-ray-curable composition satisfies 0.30≤D≤0.85, where D is a difference between a peak area ratio A and a peak area ratio B in an infrared ATR method of the cured material and is obtained by a method in which:
(i) the active-energy-ray-curable composition is coated on a polycarbonate substrate to form a coated film having an average thickness of 10 μm,
(ii) the coated film is irradiated with active energy rays having a light quantity of 500 mJ/cm$^2$ at a UV intensity of 1.0 W/cm$^2$ to cure the coated film to form a cured material,
(iii) the peak area ratio A is obtained from Formula (1) below by the infrared ATR method at one portion of the cured material, the one portion being within a region ranging from a surface of the cured material through 1 μm away from the surface of the cured material toward the substrate, the peak area ratio B is obtained from the Formula (1) below by the infrared ATR method at one portion of the cured material, the one portion being within a region ranging from an interface between the substrate and the cured material through 1 μm away from the interface toward the surface of the cured material, Peak-area (from 1,679 m$^{-1}$ through 1,751 m$^{-1}$)/peak-area (from 1,096 m$^{-1}$ through 1,130 m$^{-1}$)    Formula (1), and (iv) the peak area ratio A and the peak area ratio B obtained in the (iii) are used to obtain the difference D between the peak area ratios from Formula (2) below:

D=peak-area-ratio A−peak-area-ratio B    Formula (2).

2. The active-energy-ray-curable composition according to claim 1, wherein the polymerization initiator includes a phosphorus element.

3. The active-energy-ray-curable composition according to claim 1, wherein the polymerization initiator includes a sulfur element.

4. The active-energy-ray-curable composition according to claim 1, wherein the two or more monofunctional monomers are at least two selected from the group consisting of benzyl acrylate, cyclohexyl methacrylate, acryloyl morpholine, and dimethylaminopropylacryl amide.

5. The active-energy-ray-curable composition according to claim 1, further comprising a colorant.

6. An image forming method comprising:
ejecting the active-energy-ray-curable composition according to claim 1 on a surface of a substrate by an inkjet recording system; and
irradiating the active-energy-ray-curable composition ejected on the surface of the substrate with active energy rays to cure the active-energy-ray-curable composition.

7. An image forming apparatus comprising:
an unit configured to eject the active-energy-ray-curable composition according to claim 1 on a surface of a substrate by an inkjet recording system; and
a unit configured to irradiate the active-energy-ray-curable composition ejected on the surface of the substrate with active energy rays to cure the active-energy-ray-curable composition.

8. A cured material,
wherein the cured material is formed of the active-energy-ray-curable composition according to claim 1.

9. An active-energy-ray-curable ink comprising
an active-energy-ray-curable composition,
wherein the active-energy-ray-curable composition includes:
two or more monofunctional monomers; and
a polymerization initiator,
wherein a cured material of the active-energy-ray-curable composition satisfies 0.3≤D≤0.85, D is a difference between a peak area ratio A and a peak area ratio B in an infrared ATR method of the cured material and is obtained by a method in which:

(i) the active-energy-ray-curable composition is coated on a polycarbonate substrate to form a coated film having an average thickness of 10 μm,
(ii) the coated film is irradiated with active energy rays having a light quantity of 500 mJ/cm$^2$ at a UV intensity of 1.0 W/cm$^2$ to cure the coated film to form a cured material,
(iii) the peak area ratio A is obtained from Formula (1) below by the infrared ATR method at one portion of the cured material, the one portion being within a region ranging from a surface of the cured material through 1 μm away from the surface of the cured material toward the substrate, the peak area ratio B is obtained from the Formula (1) below by the infrared ATR method at one portion of the cured material, the one portion being within a region ranging from an interface between the substrate and the cured material through 1 μm away from the interface toward the surface of the cured material, Peak-area (from 1,679 m$^{-1}$ through 1,751 m$^{-1}$/peak-area (from 1,096 m$^{-1}$ through 1,130 m$^{-1}$)   Formula (1), and (iv) the peak area ratio A and the peak area ratio B obtained in the (iii) are used to obtain the difference D between the peak area ratios from Formula (2) below:

$D$=peak-area-ratio $A$−peak-area-ratio $B$   Formula (2).

10. An image formed matter comprising
a cured material of the active-energy-ray-curable ink according to claim 9.

11. A composition stored container; and
an active-energy-ray-curable composition; and
a container containing the active-energy-ray-curable composition,
wherein the active-energy-ray-curable composition includes:
two or more monofunctional monomers; and
a polymerization initiator,
wherein a cured material of the active-energy-ray-curable composition satisfies 0.30≤D≤0.85, where D is a difference between a peak area ratio A and a peak area ratio B in an infrared ATR method of the cured material and is obtained by a method in which:
(i) the active-energy-ray-curable composition is coated on a polycarbonate substrate to form a coated film having an average thickness of 10 μm,
(ii) the coated film is irradiated with active energy rays having a light quantity of 500 mJ/cm$^2$ at a UV intensity of 1.0 W/cm$^2$ to cure the coated film to form a cured material,
(iii) the peak area ratio A is obtained from Formula (1) below by the infrared ATR method at one portion of the cured material, the one portion being within a region ranging from a surface of the cured material through 1 μm away from the surface of the cured material toward the substrate, the peak area ratio B is obtained from the Formula (1) below by the infrared ATR method at one portion of the cured material, the one portion being within a region ranging from an interface between the substrate and the cured material through 1 μm away from the interface toward the surface of the cured material, Peak-area (from 1,679 m$^{-1}$ through 1,751 m$^{-1}$/peak-area (from 1,096 m$^{-1}$ through 1,130 m$^{-1}$)   Formula (1), and (iv) the peak area ratio A and the peak area ratio B obtained in the (iii) are used to obtain the difference D between the peak area ratios from Formula (2) below:

$D$=peak-area-ratio $A$−peak-area-ratio $B$   Formula (2).

* * * * *